United States Patent
He et al.

(10) Patent No.: US 11,505,646 B1
(45) Date of Patent: Nov. 22, 2022

(54) METHOD FOR PRODUCING HIGH-MELT-STRENGTH POLYLACTIDE RESIN

(71) Applicant: SOUTH CHINA UNIVERSITY OF TECHNOLOGY, Guangzhou (CN)

(72) Inventors: Guangjian He, Guangzhou (CN); Weitao Huang, Guangzhou (CN); Fulu Chang, Guangzhou (CN); Han Yang, Guangzhou (CN); Xianwu Cao, Guangzhou (CN); Xiaochun Yin, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/843,945

(22) Filed: Jun. 17, 2022

(30) Foreign Application Priority Data

Jun. 17, 2021 (CN) .......................... 202110670816.5

(51) Int. Cl.
| | | |
|---|---|---|
| C08G 63/08 | (2006.01) | |
| C08F 220/32 | (2006.01) | |
| C08F 222/10 | (2006.01) | |
| B29B 7/00 | (2006.01) | |
| B29C 48/40 | (2019.01) | |
| C08K 5/14 | (2006.01) | |

(52) U.S. Cl.
CPC .............. *C08G 63/08* (2013.01); *B29B 7/005* (2013.01); *B29C 48/40* (2019.02); *C08F 220/325* (2020.02); *C08F 222/103* (2020.02); *C08K 5/14* (2013.01); *B29C 2948/92704* (2019.02)

(58) Field of Classification Search
CPC ... C08L 67/04; C08G 63/6882; C08G 18/428; C08J 2367/00
See application file for complete search history.

(56) References Cited

U.S. PATENT DOCUMENTS

| 4,246,378 A | 1/1981 | Kometani et al. |
|---|---|---|
| 2006/0276617 A1* | 12/2006 | Yano ..................... C08F 290/06 528/272 |
| 2012/0196997 A1 | 8/2012 | Lu et al. |
| 2020/0291214 A1 | 9/2020 | Cherian et al. |
| 2021/0198407 A1 | 7/2021 | Rapthel et al. |

FOREIGN PATENT DOCUMENTS

| CN | 102529056 A | 7/2012 |
|---|---|---|
| CN | 102603994 A | 7/2012 |
| CN | 103923268 A | 7/2014 |
| CN | 104193879 A | 12/2014 |
| CN | 104448154 A | 3/2015 |
| CN | 106751628 A | 5/2017 |
| CN | 108570145 A | 9/2018 |
| CN | 109071717 A | 12/2018 |
| CN | 109575196 A | 4/2019 |
| CN | 110041466 A | 7/2019 |
| CN | 110373008 A | 10/2019 |

OTHER PUBLICATIONS

Nerkar et al. Dramatic Improvements in Strain Hardening and Crystallization Kinetics of PLA by Simple Reactive Modification in the Melt State, Macromol. Mater. Eng. 2014, 299, 1419-1424, published on Oct. 2014.*

Wei Zhang, Peng Li, Hong Zhu, Miqiu Kong, Yajiang Huang, Guangxian Li, "Recent Progress on Polylactide with High Melt Strength", Polymer Bulletin, Feb. 2020, pp. 1-7, Issue No. 2.

Si-Ling Su, Ji-Jie Zhao, Da-Wei Bai, Bin Yang, "Progress in the Improvement of Melt Strength of Poly(Lactic Acid)", China Plastics, Aug. 2007, pp. 7-12, vol. 21, Issue No. 8, China Academic Journal Electronic Publishing House.

Bingyu Yuan, "Studies on the Properties of Modified Polylactide Prepared by UV Irradiation Induced Reactive Extrusion", Master Thesis, Jan. 2019, Total 82 pages, South China University of Technology, Guangdong, China.

* cited by examiner

*Primary Examiner* — Gregory Listvoyb
(74) *Attorney, Agent, or Firm* — Cheng-Ju Chiang

(57) ABSTRACT

The present invention discloses a method for preparing high-melt-strength polylactide resin by two-step reaction, which comprises the following steps: mixing polylactide resin and GMA to obtain a premix; mixing multifunctional reactive monomer, a peroxide initiator and organic solvent to obtain a monomer mixture; and adding the premix and the monomer mixture into a screw extruder in sections, after melting, blending, extruding, cooling, pelletizing and drying to obtain a high melt strength polylactide resin. The method of the present invention has a simple production process, can be adapted to large-scale industrial production, the graft modification reaction is rapid and controllable, and the obtained product is safe without residue and high in purity. The high-melt-strength polylactide resin has a low melt flow index, high complex viscosity and storage modulus, and is a green polymer material with wide application prospects.

10 Claims, 3 Drawing Sheets

METHOD FOR PRODUCING HIGH-MELT-STRENGTH POLYLACTIDE RESIN

CROSS REFERENCE TO RELATED APPLICATIONS

The present invention is a 35 U.S.C. § 119 benefit of earlier filing date; right of priority of Chinese Application No. 202110670816.5, filed on Jun. 17, 2021, the disclosure of which is incorporated by reference herein.

FIELD OF THE INVENTION

The present invention relates to the field of high-performance resin, and more particularly, to a method for producing high-melt-strength polylactide resin.

BACKGROUND OF THE INVENTION polylactide (PLA) has wide raw materials and is reusable, a pollution-free production, and can be fully biodegradable, so it is one of the most environmentally friendly macromolecular materials to replace petroleum-based polymers. In addition, for "plastic restriction order" and "plastic ban order", PLA, as the biodegradable material with the most mature industrialization, the largest output and the most extensive application, its high performance is particularly important. At present, PLA can be made into different types of plastic products through extrusion, injection molding and other processing methods, and is widely used in biomedicine, industry and agriculture and food packaging and other fields. However, because PLA is a linear molecular chain, PLA has defects such as low melt strength and insufficient strain hardening, which seriously limits its large-scale application in some fields, such as film blowing, foaming, etc.

For defects of PLA, some researchers propose to introduce a long-branched structure on the linear chain of PLA to improve its melt strength. At present, the main methods of long-chain branched modification of PLA include stereospecific Polymerizations, high-energy irradiation processing, and melt-reactive extrusion. Chinese Pat. Pub. No. CN104448154A discloses a method of producing polylactide with long-chain branched structure via radiation grafting, which includes steps of: pre-blending 1,6-hexanediol diacrylate (HDDA) and PLA using a twin screw extruder, and then treating PLA/HDDA blends with Cobalt 60 at different doses and under oxygen-limiting. However, the high-energy rays used in this method have limited penetrating ability, the chain extension reaction can only be initiated on the surface of the PLA solid particles, and the reaction efficiency is low and requires a long irradiation time. In addition, Chinese Pat. Pub. No CN103923268A and CN108570145A all disclosed that a method of melt graft reaction of dicumyl peroxide (DCP) as initiator and polyfunctional reactive monomer pentaerythritol triacrylate as crosslinking agent. However, since the free radicals generated by DCP can cause severe degradation of PLA molecules, it is necessary to add antioxidants or crosslinking agents, which will introduce other substances into the PLA molecules and cannot obtain pure product. Therefore, it is an important task in this technical field to propose a new method for producing high-melt-strength polylactide that can be rapidly produced on a large scale, with simple process, controllable reaction and high product purity.

SUMMARY OF THE INVENTION

A main object of the present invention is to provide a two-step method for producing high-melt-strength polylactide resin, which can be adapted to large-scale continuous production with a simple process, and has a fast and controllable grafting reaction, and the grafted product is environmentally friendly without residue and has high purity.

To achieve the object of the present invention, a two-step method for producing high-melt-strength polylactide resin provided in this invention, comprises steps of:

a first step: obtaining a premix of 100 parts by weight of polylactide (PLA) and 0.5-3 parts by weight of glycidyl methacrylate (GMA) using a high-speed mixer to mix; and obtaining a monomer mixture of 0.2-4 parts by weight of multifunctional reactive monomer, 0.1-0.5 part by weight of a peroxide initiator and 10-30 parts by weight of organic solvent; and a second step: adding the premix and the monomer mixture into a screw extruder in sections, after melting, blending, extruding, cooling, pelletizing and drying, and then obtaining high-melt-strength polylactide resin;

wherein the premix is added from a hopper of the extruder, and the monomer mixture is added from an exhaust port at a sixth temperature zone of the extruder.

Preferably, in the first step, drying polylactide by blasting at 80-100° C. for 4-8 hours before mixing.

Preferably, in the first step, a rotation speed of the high-speed mixer is 80~120 rpm, and a stirring time is 8~15 min.

Preferably, in the first step, the multifunctional reactive monomer is at least one of: 1,6-hexanediol diacrylate (HDDA), 1,4-butanediol diacrylate (BDDA), tripropylene glycol diacrylate (TPGDA), trimethylolpropane triacrylate (TMPTA), pentaerythritol triacrylate (PETA), pentaerythritol tetraacrylate (PET4A) and dipentaerythritol hexaacrylate (DPHA); and more preferably trimethylolpropane triacrylate (TMPTA).

Preferably, in the first step, the peroxide initiator is at least one of: benzoyl peroxide, di-tert-amyl peroxide (DTAP), dicumyl peroxide (DCP), bis(tert-butyl dioxyisopropyl)benzene (BPIB), 2,5-bis(tert-butyl peroxide)-2,5-dimethylhexane (BPDH), tert-butyl cumyl peroxide (TBCP), di-tert-butyl peroxide (DTBP), diisopropylbenzene hydroperoxide (DBHP), cumene hydroperoxide (CHP) and tert-amyl hydroperoxide (TAHP); and more preferably dicumyl peroxide (DCP).

Preferably, in first step, the organic solvent is at least one of: acetone, tetrahydrofuran, dichloromethane, and chloroform; and more preferably acetone.

Preferably, in the second step, the screw extruder comprises eight temperature zones: a first temperature zone at 140~160° C., a second temperature zone at 160~180° C., and a third temperature zone to an eighth temperature zone at 180~200° C.

Preferably, in the second step, a feed rate for the screw extruder is 5~10 rpm, a screw speed is 150~180 rpm; and more preferably, a feed rate is 5 rpm, and a screw speed is 150 rpm.

Preferably, in the second step, the monomer mixture is added from an exhaust port at the sixth temperature zone of the extruder using a micro syringe.

Preferably, in the second step, the screw extruder is a twin or single screw extruder.

Preferably, in the first step, 100 parts by weight of polylactide, 1.5 parts by weight of glycidyl methacrylate; 0.5~3 parts by weight of the multifunctional reactive monomer, 0.1 part by weight of peroxide initiator, and 10 parts by weight of organic solvent are used.

More preferably, the multifunctional reactive monomer is 2-3 parts by weight.

The present invention has following advantages:

first, GMA can quickly cap the PLA molecular chains, and can introduce highly-reactive double bonds (unsaturated bonds) at the ends of the PLA molecular chains; during the free-radical chain reaction caused by peroxide at the end of the extruder, these highly-reactive double bonds are easily grafted with the multifunctional reactive monomer to obtain high-melt-strength PLA resin;

second, in the free-radical chain reaction at the end of the extruder, the highly-reactive double bonds (unsaturated bonds) of the PLA molecular chain end-capped by GMA can be preferentially attacked, thereby, severe breakage of PLA molecule chains can be avoided, additional antioxidants or cross-linking agents are not necessary, and the final product has high purity; and third, the method of the present invention is simple, and can be adapted to industrialized large-scale production; grafting reaction in the method is fast and controllable, and the obtained product has high purity, which can broaden the application field of PLA materials.

Other advantages and features of the present invention will be fully understood by reference to the following specification in conjunction with the accompanying drawings, in which like reference signs denote like components of structure.

DETAILED DESCRIPTION OF THE INVENTION

Figure 1:
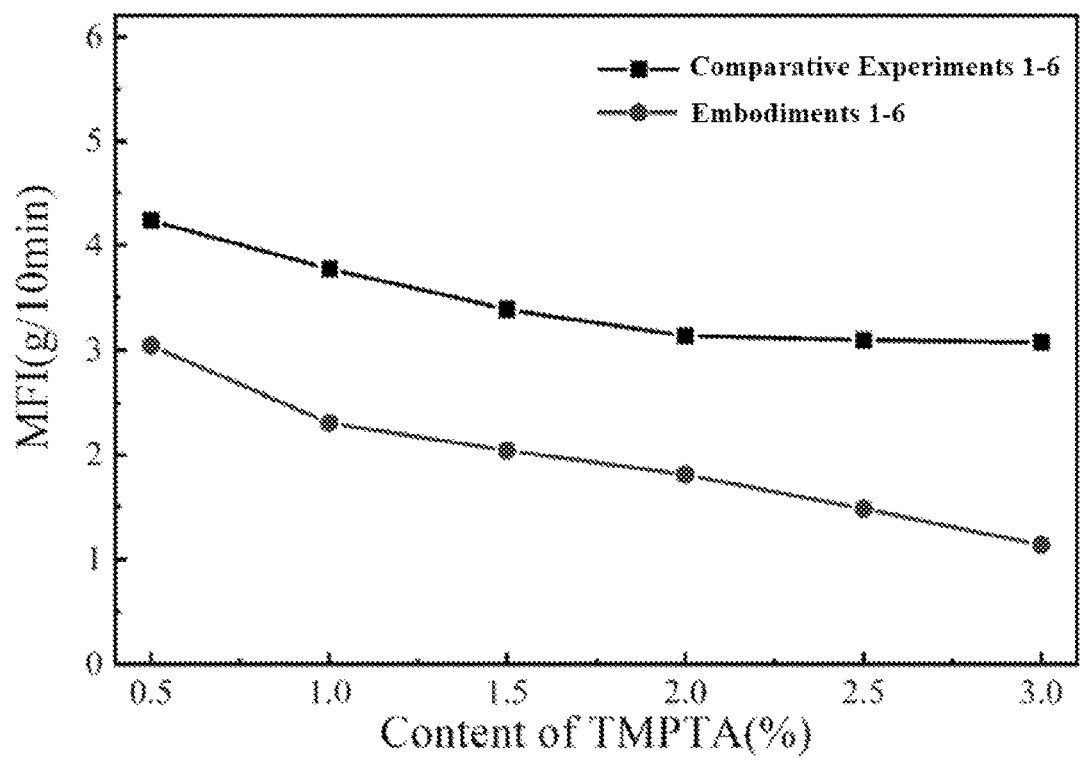
FIG. 1 is the melt flow index MFI graph of PLA resin produced respectively in accordance with the first to sixth embodiments of the present invention and the corresponding comparative experiments.

The embodiments of the present invention and the features in the embodiments can be combined with each other. The following describes the present invention in further detail with reference to the drawings and specific embodiments.

Raw materials or reagents or equipment, etc. used in the embodiments or comparative experiments of the present invention do not disclose in detail the specific use or requirements or conditions, which can be performed according to conventional conditions or manufacturers. The raw materials, reagents, etc., which are not specified by the manufacturers, are all conventional products that can be purchased from the market.

First Embodiment

A two-step method for producing high-melt-strength polylactide resin in accordance with the first embodiment of the present invention, comprises the steps described above, and specifically comprises:

(1) drying PLA particles by blasting at 80° C. for 8 h;

(2) adding 100 parts by weight of PLA after drying and 1.5 parts by weight of glycidyl methacrylate (GMA) to a high-speed mixer to mix at a rotation speed 100 rpm for 10 min, and then obtaining PLA/GMA premix;

(3) dissolving 0.5 part by weight of trimethylolpropane triacrylate (TMPTA) and 0.1 part by weight of dicumyl peroxide (DCP) in 10 parts by weight of acetone to form TMPTA/DCP dilute solution as the monomer mixture; and (4) adding PLA/GMA premix into a twin-screw extruder from a hopper thereof, adding TMPTA/DCP dilute solution into the twin-screw extruder from an exhaust port at the temperature sixth temperature zone of the extruder; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

Second Embodiment

A two-step method for producing high-melt-strength polylactide resin in accordance with the second embodiment of the present invention, comprises the steps described above, and specifically comprises:

(1) drying PLA particles by blasting at 80° C. for 8 h;

(2) adding 100 parts by weight of PLA after drying and 1.5 parts by weight of glycidyl methacrylate (GMA) to a high-speed mixer to mix at a rotation speed 100 rpm for 10 min, and then obtaining PLA/GMA premix;

(3) dissolving 1.0 part by weight of trimethylolpropane triacrylate (TMPTA) and 0.1 part by weight of dicumyl peroxide (DCP) in 10 parts by weight of acetone to form TMPTA/DCP dilute solution as the monomer mixture; and (4) adding PLA/GMA premix into a twin-screw extruder from a hopper thereof, adding TMPTA/DCP dilute solution into the twin-screw extruder from an exhaust port at the sixth temperature zone of the extruder; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

Third Embodiment

A two-step method for producing high-melt-strength polylactide resin in accordance with the third embodiment of the present invention, comprises the steps described above, and specifically comprises:

(1) drying PLA particles by blasting at 80° C. for 8 h;

(2) adding 100 parts by weight of PLA after drying and 1.5 parts by weight of glycidyl methacrylate (GMA) to a high-speed mixer to mix at a rotation speed 100 rpm for 10 min, and then obtaining PLA/GMA premix;

(3) dissolving 1.5 parts by weight of trimethylolpropane triacrylate (TMPTA) and 0.1 part by weight of dicumyl peroxide (DCP) in 10 parts by weight of acetone to form TMPTA/DCP dilute solution as the monomer mixture; and (4) adding PLA/GMA premix into a twin-screw extruder from a hopper thereof, adding TMPTA/DCP dilute solution into the twin-screw extruder from an exhaust port at the sixth temperature zone of the extruder; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

Fourth Embodiment

A two-step method for producing high-melt-strength polylactide resin in accordance with the fourth embodiment of the present invention, comprises the steps described above, and specifically comprises:

(1) drying PLA particles by blasting at 80° C. for 8 h;

(2) adding 100 parts by weight of PLA after drying and 1.5 parts by weight of glycidyl methacrylate (GMA) to a high-speed mixer to mix at a rotation speed 100 rpm for 10 min, and then obtaining PLA/GMA premix;

(3) dissolving 2.0 parts by weight of trimethylolpropane triacrylate (TMPTA) and 0.1 part by weight of dicumyl peroxide (DCP) in 10 parts by weight of acetone to form TMPTA/DCP dilute solution as the monomer mixture; and (4) adding PLA/GMA premix into a twin-screw extruder from a hopper thereof, adding TMPTA/DCP dilute solution into the twin-screw extruder from an exhaust port at the sixth temperature zone of the extruder; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

Fifth Embodiment

A two-step method for producing high-melt-strength polylactide resin in accordance with the fifth embodiment of the present invention, comprises the steps described above, and specifically comprises:

(1) drying PLA particles by blasting at 80° C. for 8 h;

(2) adding 100 parts by weight of PLA after drying and 1.5 parts by weight of glycidyl methacrylate (GMA) to a high-speed mixer to mix at a rotation speed 100 rpm for 10 min, and then obtaining PLA/GMA premix;

(3) dissolving 2.5 parts by weight of trimethylolpropane triacrylate (TMPTA) and 0.1 part by weight of dicumyl peroxide (DCP) in 10 parts by weight of acetone to form TMPTA/DCP dilute solution as the monomer mixture; and (4) adding PLA/GMA premix into a twin-screw extruder from a hopper thereof, adding TMPTA/DCP dilute solution into the twin-screw extruder from an exhaust port at the sixth temperature zone of the extruder; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

Sixth Embodiment

A two-step method for producing high-melt-strength polylactide resin in accordance with the sixth embodiment of the present invention, comprises the steps described above, and specifically comprises:

(1) drying PLA particles by blasting at 80° C. for 8 h;

(2) adding 100 parts by weight of PLA after drying and 1.5 parts by weight of glycidyl methacrylate (GMA) to a high-speed mixer to mix at a rotation speed 100 rpm for 10 min, and then obtaining PLA/GMA premix;

(3) dissolving 3.0 parts by weight of trimethylolpropane triacrylate (TMPTA) and 0.1 part by weight of dicumyl peroxide (DCP) in 10 parts by weight of acetone to form TMPTA/DCP dilute solution as the monomer mixture; and (4) adding PLA/GMA premix into a twin-screw extruder from a hopper thereof, adding TMPTA/DCP dilute solution into the twin-screw extruder from an exhaust port at the sixth temperature zone of the extruder; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

First Comparative Experiment

A method for producing polylactide resin in accordance with the first comparative experiment, comprises steps of:

(1) drying PLA particles by blasting at 80° C. for 8 h;

(2) adding 100 parts by weight of PLA particles after drying, 1.5 parts by weight of glycidyl methacrylate (GMA) and a dilute solution of 0.5 part by weight of trimethylolpropane triacrylate (TMPTA) and 0.1 part by weight of dicumyl peroxide (DCP) dissolved in 10 parts by weight of acetone to a high-speed mixer to mix at a rotation speed 100 rpm for 10 min, evaporating the solvent, and then obtaining PLA/GMA/TMPTA/DCP premix; and (3) adding PLA/GMA/TMPTA/DCP premix into a twin-screw extruder from a hopper thereof; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

Second Comparative Experiment

A method for producing polylactide resin in accordance with the second comparative experiment, comprises steps of:

(1) drying PLA particles by blasting at 80° C. for 8 h;

(2) adding 100 parts by weight of PLA particles after drying, 1.5 parts by weight of glycidyl methacrylate (GMA) and a dilute solution of 1.0 part by weight of trimethylolpropane triacrylate (TMPTA) and 0.1 part by weight of dicumyl peroxide (DCP) dissolved in 10 parts by weight of acetone to a high-speed mixer to mix at a rotation speed 100 rpm for 10 min, evaporating the solvent, and then obtaining PLA/GMA/TMPTA/DCP premix; and (3) adding PLA/GMA/TMPTA/DCP premix into a twin-screw extruder from a hopper thereof; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

Third Comparative Experiment

A method for producing polylactide resin in accordance with the third comparative experiment, comprises steps of:
(1) drying PLA particles by blasting at 80° C. for 8 h;
(2) adding 100 parts by weight of PLA particles after drying, 1.5 parts by weight of glycidyl methacrylate (GMA) and a dilute solution of 1.5 parts by weight of trimethylolpropane triacrylate (TMPTA) and 0.1 part by weight of dicumyl peroxide (DCP) dissolved in 10 parts by weight of acetone to a high-speed mixer to mix at a rotation speed 100 rpm for 10 min, evaporating the solvent, and then obtaining PLA/GMA/TMPTA/DCP premix; and
(3) adding PLA/GMA/TMPTA/DCP premix into a twin-screw extruder from a hopper thereof; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

Fourth Comparative Experiment

A method for producing polylactide resin in accordance with the fourth comparative experiment, comprises steps of:
(1) drying PLA particles by blasting at 80° C. for 8 h;
(2) adding 100 parts by weight of PLA particles after drying, 1.5 parts by weight of glycidyl methacrylate (GMA) and a dilute solution of 2.0 parts by weight of trimethylolpropane triacrylate (TMPTA) and 0.1 part by weight of dicumyl peroxide (DCP) dissolved in 10 parts by weight of acetone to a high-speed mixer to mix at a rotation speed 100 rpm for 10 min, evaporating the solvent, and then obtaining PLA/GMA/TMPTA/DCP premix; and
(3) adding PLA/GMA/TMPTA/DCP premix into a twin-screw extruder from a hopper thereof; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

Fifth Comparative Experiment

A method for producing polylactide resin in accordance with the fifth comparative experiment, comprises steps of:
(1) drying PLA particles by blasting at 80° C. for 8 h;
(2) adding 100 parts by weight of PLA particles after drying, 1.5 parts by weight of glycidyl methacrylate (GMA) and a dilute solution of 2.5 parts by weight of trimethylolpropane triacrylate (TMPTA) and 0.1 part by weight of dicumyl peroxide (DCP) dissolved in 10 parts by weight of acetone to a high-speed mixer to mix at a rotation speed 100 rpm for 10 min, evaporating the solvent, and then obtaining PLA/GMA/TMPTA/DCP premix;
(3) adding PLA/GMA/TMPTA/DCP premix into a twin-screw extruder from a hopper thereof; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

Sixth Comparative Experiment

A method for producing polylactide resin in accordance with the sixth comparative experiment, comprises steps of:
(1) drying PLA particles by blasting at 80° C. for 8 h;
(2) adding 100 parts by weight of PLA particles after drying, 1.5 parts by weight of glycidyl methacrylate (GMA) and a dilute solution of 1.0 part by weight of trimethylolpropane triacrylate (TMPTA) and 0.1 part by weight of dicumyl peroxide (DCP) dissolved in 10 parts by weight of acetone to a high-speed mixer to mix at a rotation speed 100 rpm for 10 min, evaporating the solvent, and then obtaining PLA/GMA/TMPTA/DCP premix;
(3) adding PLA/GMA/TMPTA/DCP premix into a twin-screw extruder from a hopper thereof; after melting; blending, extruding, water cooling, pelletizing and drying, and then obtaining the product; where the temperature of each temperature zone and the speed of the twin-screw extruder respectively are: the first temperature zone at 160° C., the second zone at 180° C., the third to the eight temperature zone at 200° C.; a feed rate for the screw extruder 5 rpm, and a speed of the screw host 150 rpm.

FIG. 1 is the melt flow index (MFI) graph of PLA resin produced in accordance with the first to sixth embodiments in the present invention and the corresponding comparative experiments thereof. The MFI values of PLA resin are obtained by testing according to GB/T-3682 standard. It is generally believed that there is an interdependent relationship between the MFI value and the melt strength of the polymer, and the smaller the MFI value, the greater the melt strength of the polymer. As can be seen from FIG. 1, the MFI values of the PLA resin produced in accordance with the embodiments of the present invention are all smaller than the MFI values of the PLA resin produced in the corresponding comparative experiments, which shows that the method for producing PLA resin in the present invention can improve melt strength thereof.

Figure 2:
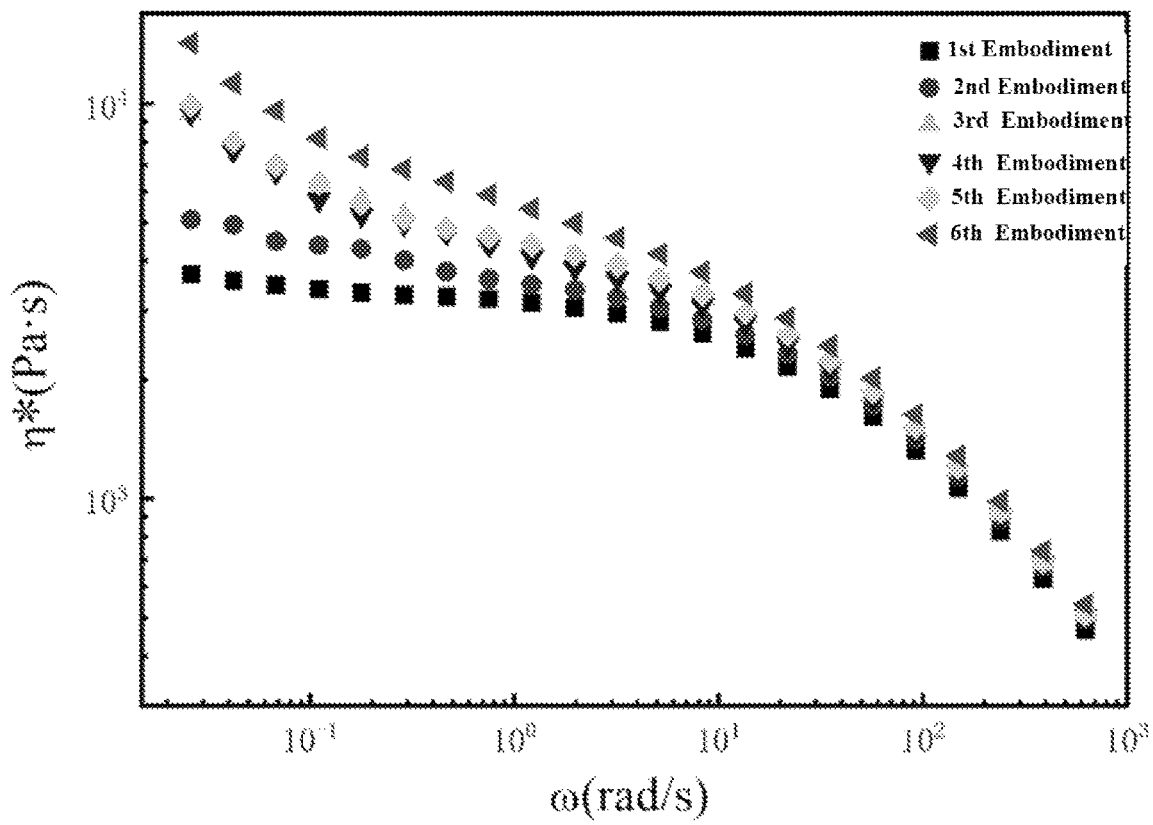
FIG. 2 is the graph showing the complex viscosity $\eta^*(Pa \cdot s)$ of PLA resin and frequency $\omega(rad/s)$, where PLA resin is produced respectively in accordance with the first to sixth embodiments of the present invention.
Figure 3:
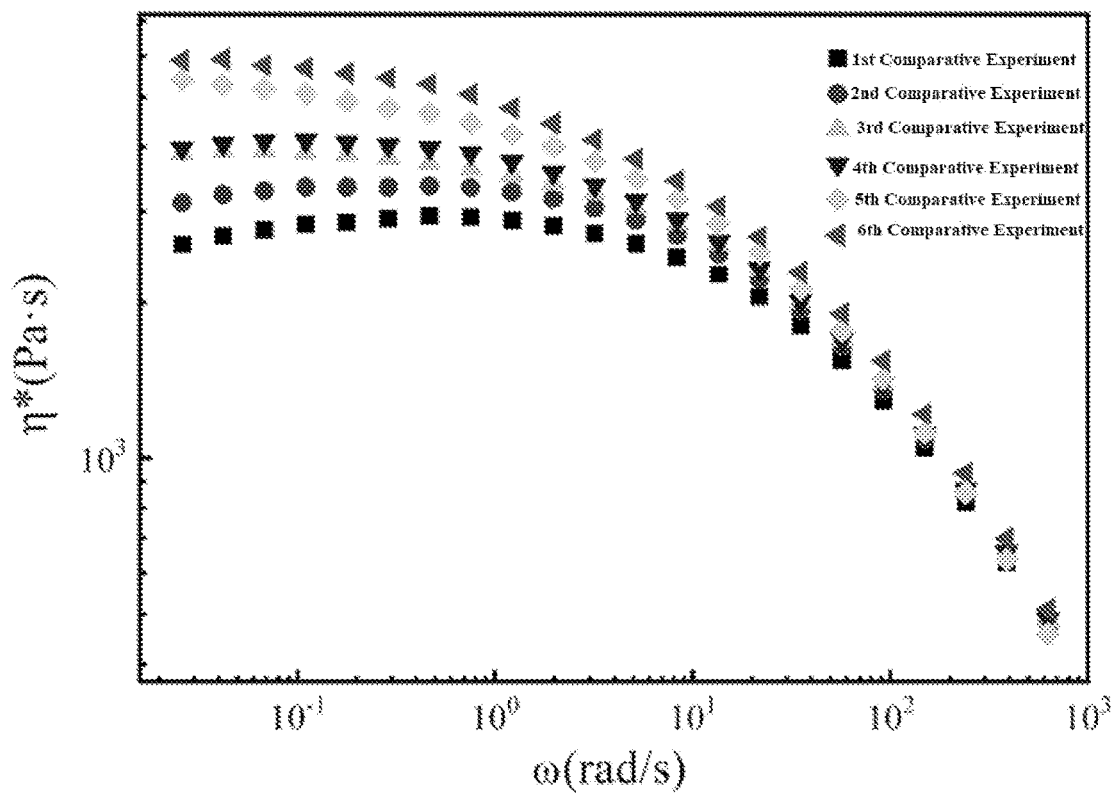
FIG. 3 is the graph showing the complex viscosity $\eta^*(Pa \cdot s)$ of PLA resin and frequency $\omega(rad/s)$, where PLA resin is produced respectively in accordance with the first to sixth comparative experiments.

FIGS. 2-3 are the graph showing the complex viscosity $\eta^*$(Pa·s) of PLA resin and angular frequency $\omega$(rad/s), where PLA resin is produced respectively in accordance with the first to sixth embodiments of the present invention and the corresponding comparative experiments thereof. The test conditions are: temperature 200° C., strain 1%, test frequency range 0.01-100 Hz, nitrogen atmosphere. When a branch is introduced into the PLA molecular chain, the intermolecular entanglement increases, so its $\eta^*$ value also increases, and the onset of shear-thinning shifts to the low-frequency region. As can be seen from FIG. 2, in the low frequency region, the $\eta^*$ values of the PLA resin produced in accordance with the first to sixth embodiments of the present invention are larger than the $\eta^*$ values of the PLA resin prepared in the corresponding comparative experiments; and when consumption of TMPTA reaches a certain level, the platform on the $\eta^*$–$\omega$ graph in accordance with the first to sixth embodiments disappears in the low-frequency region, while the η*-ω graph begins to turn upward, which shows that the PLA resin prepared in the embodiments of the present invention has more long branched structures in the molecular chains, so that the molecular entanglement of PLA increases, and the value of ω* increases.

Figure 4:
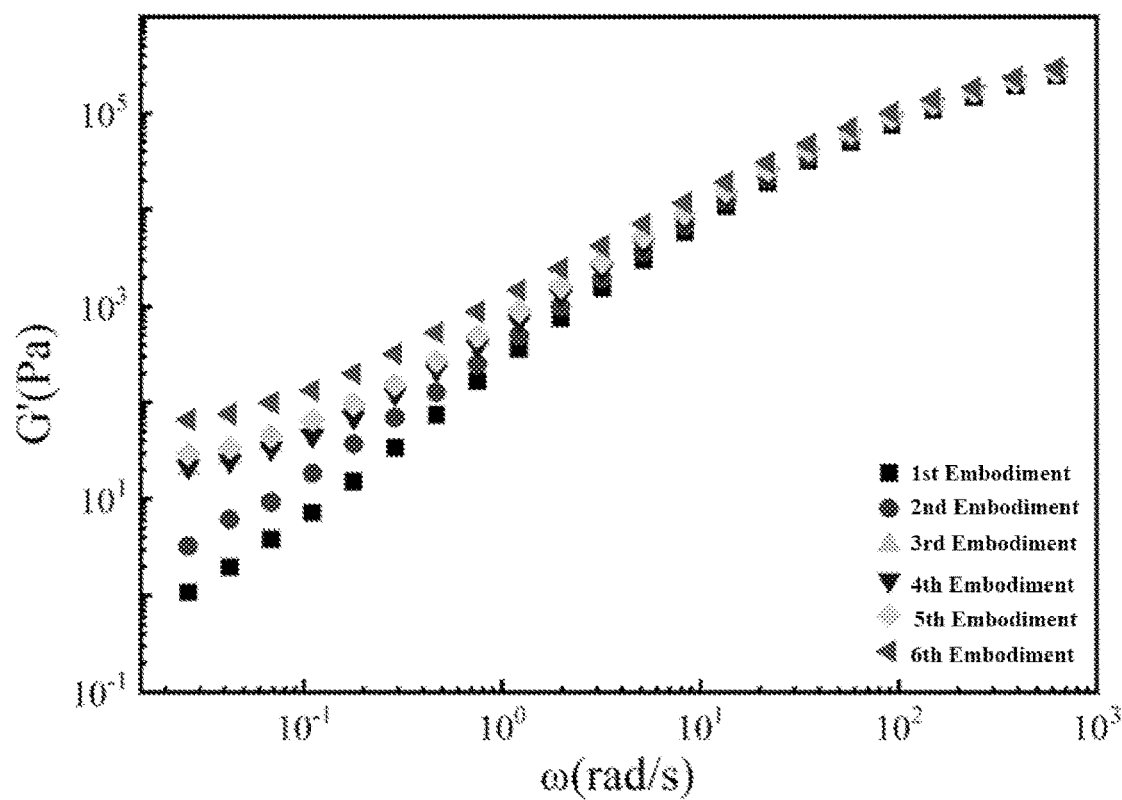
FIG. 4 is the graph showing the storage modulus $G'(Pa)$ of PLA resin and frequency $\omega(rad/s)$, where PLA resin is produced respectively in accordance with the first to sixth embodiments of the present invention.
Figure 5:
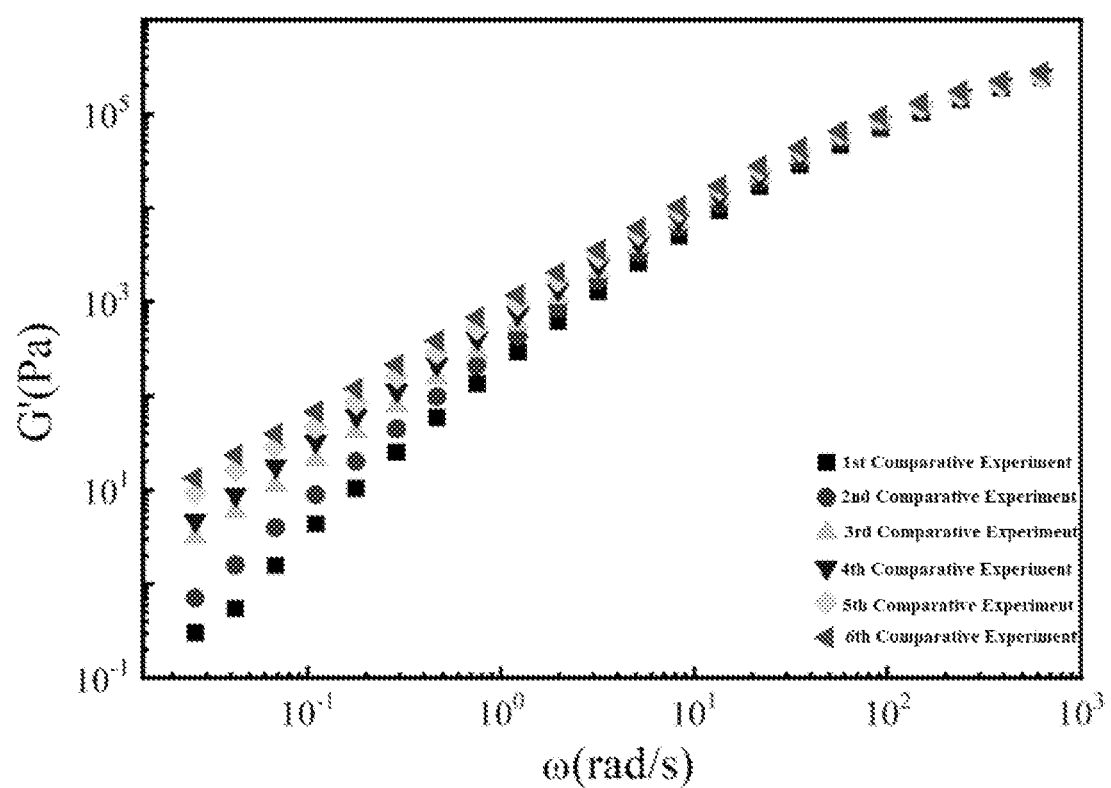
FIG. 5 is the graph showing the storage modulus $G'(Pa)$ of PLA resin and frequency $\omega(rad/s)$, where PLA resin is produced respectively in accordance with the first to sixth comparative experiments.

FIGS. 4-5 are the graph of the storage modulus G'(Pa) of PLA resin and angular frequency ω(rad/s), where the PLA resin is produced respectively in accordance with the first to sixth embodiment of the present invention and the corresponding comparative experiments thereof. The test conditions are: temperature 200° C., strain 1%, test frequency range 0.01-100 Hz, nitrogen atmosphere. The higher the E' value, the better melt elasticity of polymer. The melt elasticity of polymer is dependent on melt strength thereof. At a certain temperature range, the better melt elasticity, the higher melt strength of polymer. As can be seen from FIGS. 4-5, in the low frequency region, the G' values of PLA resin prepared in accordance with the first to sixth embodiments of the present invention are all larger than the G' values of PLA resin prepared in the corresponding experiments; and with the consumption of TMPTA, the G' value also increases continuously and a small plateau appears on the graph in the low frequency region, which shows that the melt elasticity and melt strength of PLA resin prepared in the embodiments of the present invention are significantly improved.

In conjunction with FIG. 1 to FIG. 5, high melt strength polylactic acid resin can be obtained using the method of the present invention, and this method will greatly expand the application field of PLA materials.

The above-described embodiments are preferred embodiments of the present invention, but the embodiments of the present invention are not limited by the above-described embodiments. Any changes, modifications, substitutions, combination, and simplification that do not depart from the spirit and principle of the present invention should be equivalent replacement modes, which are all included in the protection scope of the present invention. The invention is set out in the appended set of claims.

What the invention claimed is:

1. A method for producing high-melt-strength polylactide resin by two-step reaction, comprising steps of:
    a first step: obtaining a premix of 100 parts by weight of polylactide and 0.5-3 parts by weight of glycidyl methacrylate using a high-speed mixer to mix; and obtaining a monomer mixture of 0.2-4 parts by weight of multifunctional reactive monomer, 0.1-0.5 part by weight of a peroxide initiator and 10-30 parts by weight of an organic solvent; and
    a second step: adding the premix and the monomer mixture into a screw extruder, after melting, blending, extruding, cooling, pelletizing and drying, and then obtaining high-melt-strength polylactide resin;
    wherein the premix is added from a hopper of the screw extruder, the monomer mixture is added from an exhaust port at a sixth temperature zone of the screw extruder; and said multifunctional reactive monomer in the first step is at least one of: 1,6-hexanediol diacrylate, 1,4-butanediol diacrylate, tripropylene glycol diacrylate, trimethylolpropane triacrylate, pentaerythritol triacrylate, pentaerythritol tetraacrylate and dipentaerythritol hexaacrylate.

2. The method of claim 1, wherein said peroxide initiator in the first step is at least one of: benzoyl peroxide, di-tert-amyl peroxide, dicumyl peroxide, bis (tert-butyl dioxyisopropyl) benzene, 2,5-bis(tert-butyl peroxide)-2,5-dimethylhexane, tert-butyl cumyl peroxide, di-tert-butyl peroxide, diisopropylbenzene hydroperoxide, cumene hydroperoxide and tert-amyl hydroperoxide.

3. The method of claim 2, wherein in the first step, said multifunctional reactive monomer is trimethylolpropane triacrylate; and said peroxide initiator is dicumyl peroxide.

4. The method of claim 1, wherein in the second step, the screw extruder comprises eight temperature zones: a first temperature zone at 140~160° C., a second temperature zone at 160~180° C., and a third to an eighth temperature zones at 180~200° C.

5. The method of claim 1, wherein in the first step, 100 parts by weight of polylactide, 1.5 parts by weight of glycidyl methacrylate, 0.5-3 parts by weight of a multifunctional reactive monomer, 0.1 part by weight of a peroxide initiator, and 10 parts by weight of an organic solvent are used.

6. The method of claim 1, wherein in the second step, the monomer mixture is added from an exhaust port at the sixth temperature zone of the screw extruder using a micro syringe.

7. The method of claim 1, wherein in the first step, a rotation speed of the high-speed mixer is 80-120 rpm, and a stirring time is 8~15 min; in the second step, a feed rate for the screw extruder is 5~10 rpm, and a screw speed is 150~180 rpm.

8. The method of claim 7, wherein in the second step, a feed rate for the screw extruder is 5 rpm, and a screw speed is 150 rpm.

9. The method of claim 1, wherein in the second step, the screw extruder is a twin or single screw extruder.

10. The method of claim 1, wherein in first step, drying polylactide by blasting at 80-100° C. for 4-8 hours before mixing; and the organic solvent is at least one of: acetone, tetrahydrofuran, dichloromethane, and chloroform.

* * * * *